US006672802B2

(12) United States Patent
Putnam

(10) Patent No.: US 6,672,802 B2
(45) Date of Patent: Jan. 6, 2004

(54) VERTICAL PULL APPARATUS

(76) Inventor: Samuel W. Putnam, 305 Darbonne Dr., West Monroe, LA (US) 71291

( * ) Notice: Subject to any disclaimer, the term of this patent is extended or adjusted under 35 U.S.C. 154(b) by 0 days.

(21) Appl. No.: 10/234,216

(22) Filed: Sep. 4, 2002

(65) Prior Publication Data

US 2003/0059260 A1 Mar. 27, 2003

Related U.S. Application Data

(60) Provisional application No. 60/324,223, filed on Sep. 24, 2001.

(51) Int. Cl.[7] .......................... E02F 5/10; F16L 55/18; B66D 1/00

(52) U.S. Cl. .................... 405/184; 405/154.1; 405/177; 405/184.3; 138/97; 254/259; 254/264; 226/147

(58) Field of Search ............................ 405/154.1, 156, 405/174, 177, 184, 184.1; 138/97, 98; 254/134.3, 385, 386, 384, 259, 264; 226/149, 150, 147, 148, 151, 162, 165, 166, 167

(56) References Cited

U.S. PATENT DOCUMENTS

| | | | | | |
|---|---|---|---|---|---|
| 4,457,647 | A | | 7/1984 | Dusette et al. | 405/154.1 |
| 4,634,313 | A | | 1/1987 | Robbins | 405/154.1 |
| 4,685,831 | A | * | 8/1987 | Mahoney | 405/156 |
| 4,747,579 | A | * | 5/1988 | Rich | 254/386 |
| 5,173,009 | A | | 12/1992 | Moriarty | 405/154.1 |
| 5,190,409 | A | * | 3/1993 | Hall | 405/154.1 |
| 5,192,165 | A | | 3/1993 | Torielli | 405/156 |
| 5,205,671 | A | | 4/1993 | Handford | 405/154.1 |
| 5,211,509 | A | * | 5/1993 | Roessler | 405/184 |
| 5,302,053 | A | | 4/1994 | Moriarty | 405/154.1 |
| 5,328,297 | A | | 7/1994 | Hanford | 405/184 |
| 5,403,122 | A | | 4/1995 | Granella | 405/184 |
| 5,642,912 | A | | 7/1997 | Parish, II | 294/86.12 |
| 5,709,503 | A | | 1/1998 | Manlow | 405/154.1 |
| 5,782,311 | A | | 7/1998 | Wentworth | 175/53 |
| 5,785,458 | A | | 7/1998 | Handford | 405/184 |
| 5,895,176 | A | * | 4/1999 | Puttman | 405/184 |
| 6,092,553 | A | | 7/2000 | Hodgson | 138/97 |
| 6,109,832 | A | | 8/2000 | Lincoln | 405/184 |
| 6,129,486 | A | | 10/2000 | Putnam | 405/184 |
| 6,244,783 | B1 | | 6/2001 | Puttman et al. | 405/184 |
| 6,443,658 | B1 | * | 9/2002 | Lincoln | 405/184.1 |

FOREIGN PATENT DOCUMENTS

| | | | |
|---|---|---|---|
| EP | 694675 | * | 1/1996 |
| GB | 2291690 | * | 1/1996 |

* cited by examiner

*Primary Examiner*—Jong-Suk (James) Lee
(74) *Attorney, Agent, or Firm*—John M. Harrison

(57) ABSTRACT

A vertical pull apparatus for converting a vertical pulling motion to a horizontal pulling motion, which vertical pull apparatus typically includes a support for positioning in a generally vertical position. A cable-engaging mechanism is provided on the support, which cable-engaging mechanism engages a cable and defines a generally vertical cable segment and a generally horizontal cable segment in the cable. A first cable-gripping element and a second cable-gripping element on the support alternately and repeatedly grip and release the vertical cable segment of the cable. At least one of the cable-gripping elements is adapted for gripping and pulling the vertical cable segment of the cable along a vertical axis, such that the horizontal cable segment is pulled along a horizontal axis.

20 Claims, 3 Drawing Sheets

VERTICAL PULL APPARATUS

CROSS-REFERENCE TO RELATED APPLICATIONS

This application claims the benefit of U.S. Provisional Application Serial No. 60/324,223, filed Sep. 24, 2001 now abandoned.

BACKGROUND OF THE INVENTION

FIELD OF THE INVENTION

This invention relates to apparatus for transmitting pulling motion from along a generally vertical axis to along a generally horizontal axis, and more particularly, to a vertical pull apparatus typically including a support which is positioned in a generally vertical position. A cable-engaging mechanism provided on the support engages a cable and defines a generally vertical cable segment and a generally horizontal cable segment in the cable. A first cable-gripping element and a second cable-gripping element on the support alternately and repeatedly grip and release the vertical cable segment of the cable. At least one of the cable-gripping elements is adapted for gripping and pulling the vertical cable segment of the cable, such that the horizontal cable segment is pulled horizontally.

Underground water, gas, sewer and other utility pipes typically require replacement after an extended period of use, frequently due to corrosion or damage to the pipes. Usually, digging trenches to expose the damaged pipes for replacement is undesirable since this frequently requires destruction of streets, sidewalks, parking lots or lawns, which is unsightly and expensive. To avoid these problems, various techniques and apparatuses have been devised to destroy the pipe in need of replacement and draw a new pipe into place without having to excavate trenches for the operation. Generally, the techniques involve excavating the ground at both ends of the pipe to be replaced and positioning a hydraulic pulling device of selected design in one of the excavations and a cutting tool at the opposite end of the pipe in the other excavation. A cable is extended from the pulling device, through the pipe and attached to the cutting tool at the opposite end of the pipe. As the hydraulic pulling device is operated to pull the cutting tool against the pipe, a pneumatic hammer may be used to repeatedly strike the cutting tool against the pipe, and the combined pulling action of the pulling device and striking action of the hammer on the cutting tool causes the tool to migrate and progressively cut and burst the pipe along the entire length of the pipe. A replacement pipe is typically attached to the cutting tool such that the replacement pipe is drawn into position behind the cutting tool as the cutting tool bursts the old pipe. Under circumstances in which the hydraulic pulling device must be placed in a manhole at one end of the pipe, the narrow confines of the manhole render difficult adequate positioning of the hydraulic pulling device for the pipe bursting and replacing operation.

A variety of devices are known in the art for transmitting a vertical or angled pulling motion into a horizontal pulling motion. Typical of these are the devices detailed in U.S. Pat. Nos. 4,318,835; 4,457,647; 4,685,831; 5,173,009; 5,192,165; 5,302,053; 5,328,297; 5,403,122; 5,642,912; 5,709,503; 6,109,832; and 6,244,783.

Devices of various design are known in the art for bursting or re-rounding underground pipes. Patents of interest in this regard include U.S. Pat. Nos. 4,457,647; 4,634,313; 5,173,009; 5,192,165; 5,205,671; 5,302,053; 5,328,297; 5,403,122; 5,642,912; 5,709,503; 5,782,311; 5,785,458; 6,092,553; 6,109,832; 6,129,486; and 6,244,783.

An object of the present invention is to provide a vertical pull apparatus for transmitting a generally vertical pulling motion into a generally horizontal pulling motion.

Another object of this invention is to provide a vertical pull apparatus which is capable of a variety of applications.

Still another object of this invention is to provide a vertical pull apparatus including a support for positioning in a generally vertical position; a cable-engaging mechanism provided on the support; a cable engaging the cable-engaging mechanism such that the cable-engaging mechanism defines a generally vertical cable segment and a generally horizontal cable segment in the cable; and first and second cable-gripping elements provided on the support for repeatedly and alternatively engaging the vertical cable segment of the cable, wherein at least one of the cable-gripping elements grips and pulls the vertical cable segment to pull the horizontal cable segment of the cable along a horizontal axis.

SUMMARY OF THE INVENTION

These and other objects of the invention are provided in a vertical pull apparatus for converting a vertical pulling action to a horizontal pulling action, which vertical pull apparatus typically includes a support for positioning in a generally vertical position. A cable-engaging mechanism is provided on the support, which cable-engaging mechanism engages a cable and defines a generally vertical cable segment and a generally horizontal cable segment in the cable. A first cable-gripping element and a second cable-gripping element on the support alternately and repeatedly grip and release the vertical cable segment of the cable. At least one of the cable-gripping elements is adapted for gripping and pulling the vertical cable segment of the cable along a vertical axis, such that the horizontal cable segment is pulled along a horizontal axis.

BRIEF DESCRIPTION OF THE DRAWINGS

The invention will be better understood by reference to the accompanying drawings, wherein.

DESCRIPTION OF THE PREFERRED EMBODIMENTS

Figure 2:
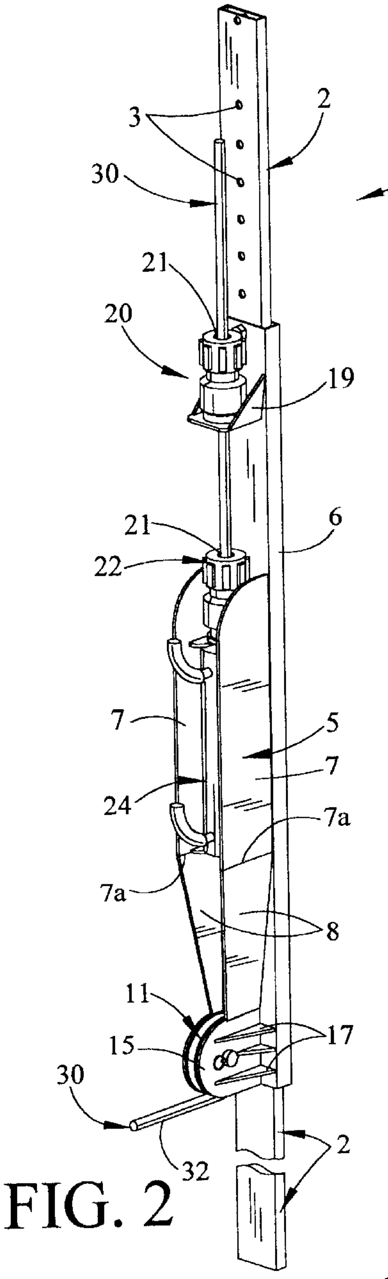
FIG. 2 is a perspective view, partially in section, of the vertical pull apparatus, with an upper cable-gripping element and a lower cable-gripping element receiving a cable (partially in section)

Referring initially to FIGS. 2–6 of the drawings, an illustrative embodiment of the vertical pull apparatus of this invention is generally illustrated by reference numeral 1. The vertical pull apparatus 1 typically includes an elongated, vertical piling 2, typically fitted with multiple, spaced-apart piling bolt openings 3, as particularly illustrated in FIG. 6. The elongated power pole base 6 of a power pole 5 slidably receives the piling 2 and can be mounted at a selected height on the piling 2 by extending a piling bolt 4 through a pair of registering base openings 6*a* in the power pole base 6 and through a selected registering piling bolt opening 3 in the piling 2, and threading a nut 4*a* on the piling bolt 4. A cable gripping element bracket 19, having a bracket opening 19*a*, is provided on the front surface of the power pole base 6 adjacent to the upper end thereof. The bracket opening 19*a* receives an upper cable-gripping element 20, typical of which is detailed in my U.S. Pat. No. 6,129,486 and includes a gripping element opening 21 for purposes hereinafter described. A pair of parallel side flanges 7 typically further extends from the front surface of the power pole base 6, beneath the cable gripping element bracket 19, and a pair of vertically-spaced cylinder mount brackets 9 each spans the side flanges 7 for purposes hereinafter described. A pair of bottom flanges 8 extends from the respective side flanges 7 on the power pole base 6, typically at welds 7*a*, and the bottom flanges 8 angle downwardly toward each other. The bottom ends of the bottom flanges 8 are fitted with respective sheave mount plates 15, disposed in parallel, facing relationship to each other. The sheave mount plates 15 may be reinforced on the power pole base 6 by means of multiple mount plate gussets 17. Registering mount plate openings 16 extend through the respective sheave mount plates 15 and receive a sheave mount shaft 12, which further extends through a central sheave opening 11*a* provided in a sheave 11 to rotatably mount the sheave 11 between the sheave mount plates 15, for purposes hereinafter described. The sheave mount shaft 12 is secured in the mount plate openings 16 of the sheave mount plates 15, typically by means of a pair of mount pins 13, in conventional fashion.

Figure 6:
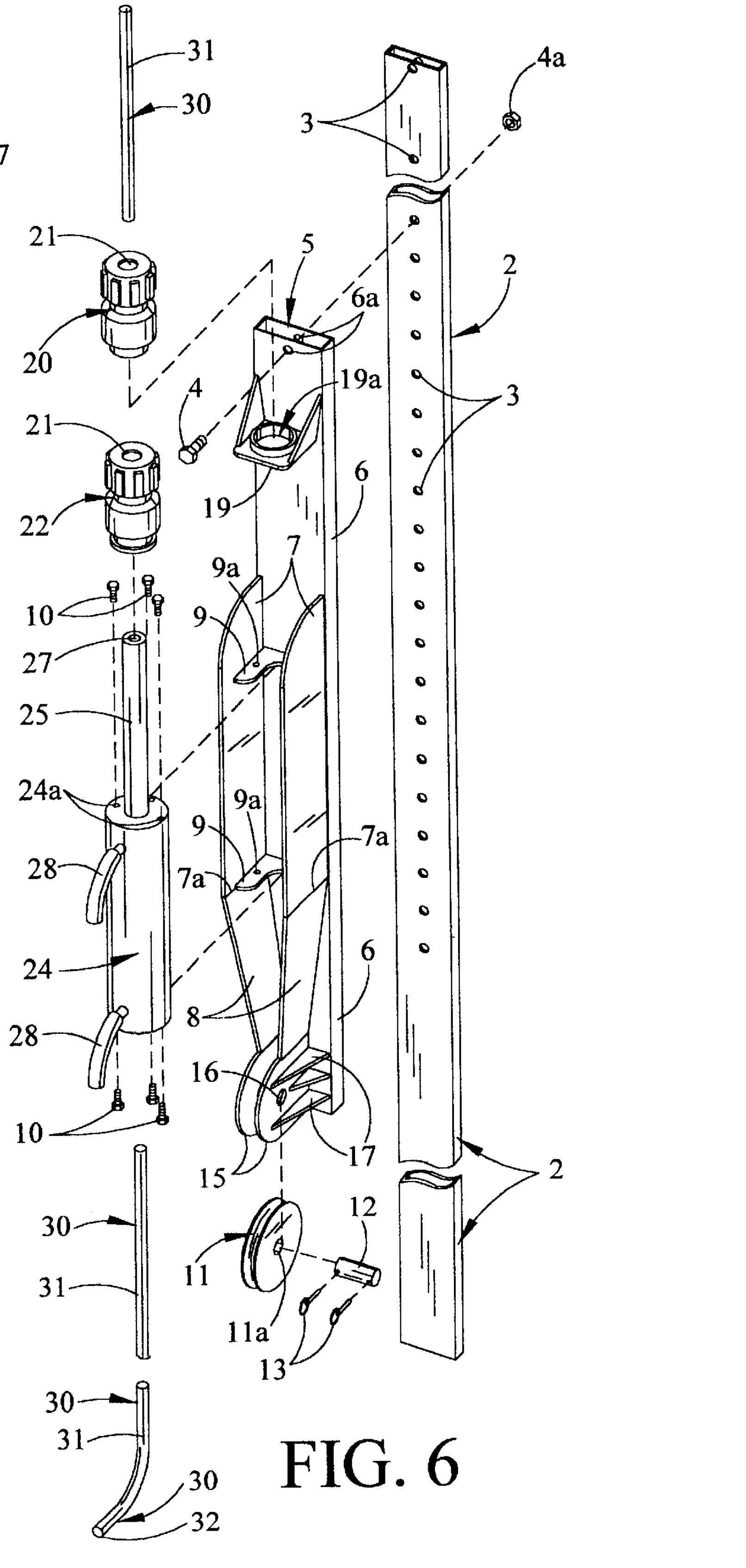
FIG. 6 is an exploded, perspective view, partially in section, of the vertical pull apparatus.

As further illustrated in FIG. 6, a hydraulic cylinder 24 is mounted on the cylinder mount brackets 9, between the side flanges 7 of the power pole 5, typically by means of multiple cylinder mount bolts 10 extended through respective bracket bolt openings 9*a* provided in each cylinder mount bracket 9 and threaded into respective registering cylinder bolt openings 24*a*, provided in a corresponding end of the hydraulic cylinder 24. The hydraulic cylinder 24 is fitted with a pair of hydraulic lines 28 for connection to a hydraulic pump and supply mechanism (not illustrated). A piston 25, traversed by a piston cable bore or opening 27, is extendible from and retractable in the hydraulic cylinder 24 by operation of hydraulic fluid flow through the hydraulic lines 28 and hydraulic cylinder 24, in conventional fashion. A lower cable-gripping element 22, typically as detailed in my U.S. Pat. No. 6,129,486 and typically similar in design to the upper cable-gripping element 20, is provided on the extending end of the piston 25. The lower cable-gripping element 22 includes a gripping element opening 21.

Figure 3:
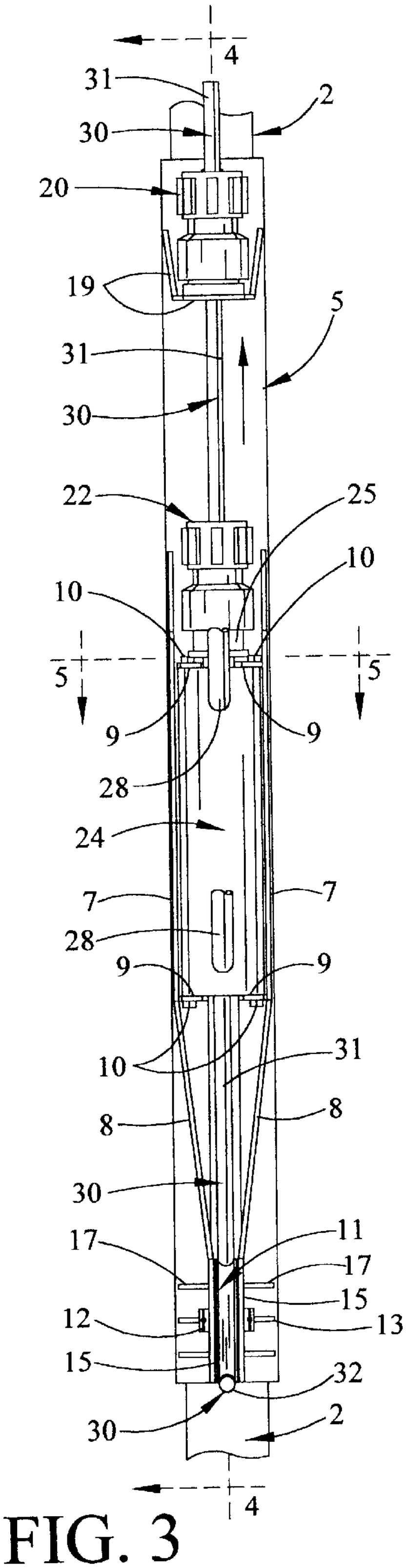
FIG. 3 is a front view, partially in section, of the vertical pull apparatus, with the upper cable-gripping element in the cable-releasing configuration and the lower cable-gripping element in the cable-gripping configuration, preparatory to pulling the cable.

Accordingly, in application of the vertical pull apparatus 1 as hereinafter described, a cable 30, typically wound on a spool 34 (FIG. 1) which is typically rotatably mounted on a truck (not illustrated) or other support, for example, extends downwardly through the gripping element opening 21 of the upper cable-gripping element 20, the gripping element opening 21 of the lower cable-gripping element 22, the piston cable bore or opening 27 of the piston 25, and the hydraulic cylinder 24, respectively, and is extended around the sheave 11 to define a vertical cable segment 31 and a horizontal cable segment 32 in the cable 30. Accordingly, in operation of the vertical pull apparatus 1 as hereinafter described, the piston 25 is initially disposed in the retracted position in the hydraulic cylinder 24, as illustrated in FIG. 3, with the lower cable-gripping element 22 and the upper cable-gripping element 20 each lightly engaging the vertical cable segment 31 of the cable 30. Upon initial extension of the piston 25 from the hydraulic cylinder 24, the lower cable-gripping element 22 grips the cable 30, and continued extension of the piston 25 from the hydraulic cylinder 24 causes the lower cable-gripping element 22 to pull the gripped cable 30 upwardly through the hydraulic cylinder 24 and the sheave 11 such that the horizontal cable segment 32 of the cable 30 is pulled horizontally through the sheave 11, as indicated by the arrows in FIG. 4. Simultaneously, the upwardly-moving cable 30 initially moves the upper cable-gripping element 20 to an open, non-engaging conformation with respect to the cable 30, and the cable 30 thus freely extends upwardly through the upper cable-gripping element 20 and is wound on the spool 34 throughout full extension of the piston 25 from the hydraulic cylinder 24. After the full throw of the piston 25 from the hydraulic cylinder 24 has been reached and the lower cable-gripping element 22 is in the uppermost position illustrated in FIG. 4, the piston 25 is retracted into the hydraulic cylinder 24, and the lower cable-gripping element 22 releases the cable 30 and returns to the lowermost position illustrated in FIG. 3. Simultaneously, the upper cable-gripping element 20 grips the cable 30 and prevents inadvertent downward slippage of the cable 30 through the upper cable-gripping element 20 and the lower cable-gripping element 22 until the lower cable-gripping element 22 returns to the lowermost position of FIG. 3 preparatory to a second pulling action on the cable 30. At that point, the piston 25 is again extended from the hydraulic cylinder 24 and the upper cable-gripping element 20 releases the cable 30 as the lower cable-gripping element 22 grips and pulls the cable 30 upwardly through the hydraulic cylinder 24 and sheave 11.

Figure 1:
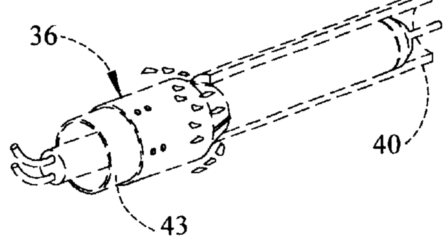
FIG. 1 is a perspective view of an illustrative embodiment of the vertical pull apparatus of this invention, in a typical application of the invention.
Figure 1:
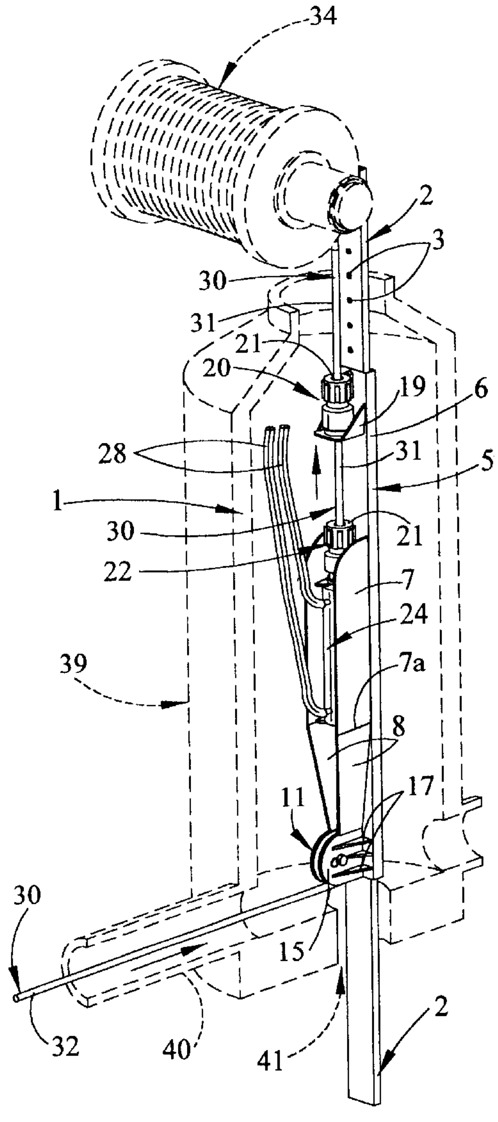
Figure 4:
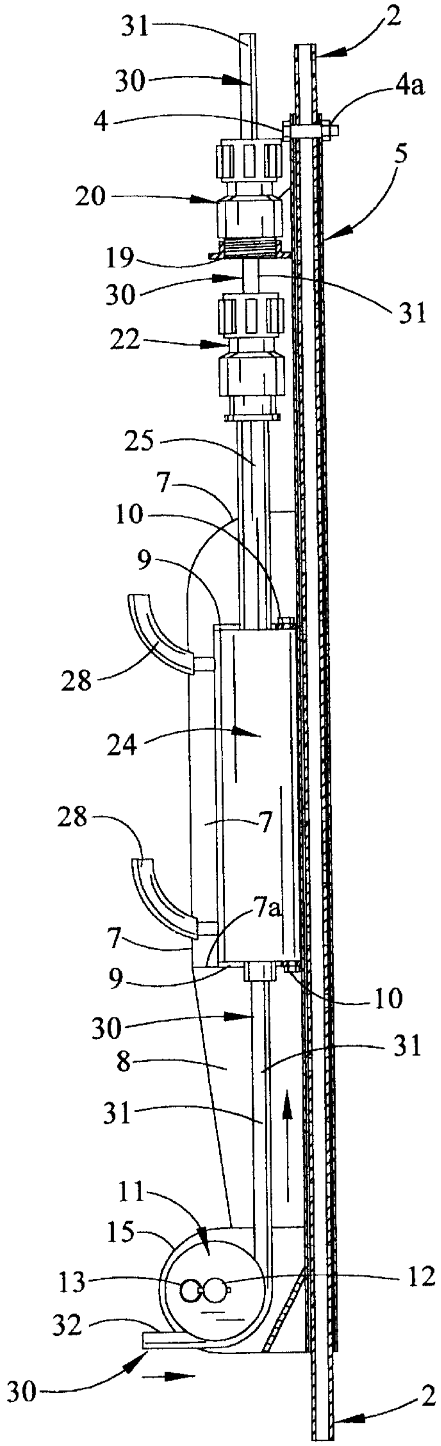
FIG. 4 is a longitudinal sectional view, taken along section lines 4—4 in FIG. 3, of the vertical pull apparatus, with the upper cable-gripping element in the cable-gripping configuration and the lower cable-gripping element in the cable-releasing configuration prior to repositioning of the lower cable-gripping element after pulling the cable.
Figure 5:
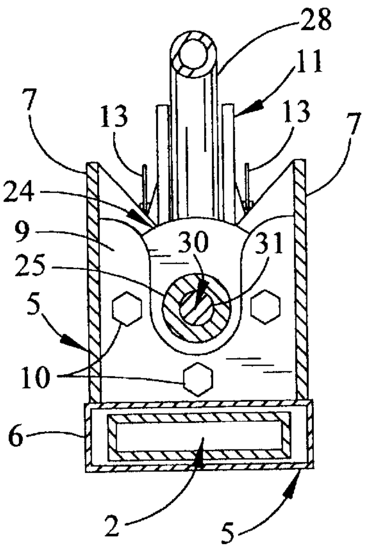
FIG. 5 is a transverse sectional view, taken along section lines 5—5 in FIG. 3, of the vertical pull apparatus.

Referring next to FIG. 1 and again to FIGS. 3 and 4 of the drawings, in typical application the vertical pull apparatus 1 is suitably adapted for bursting and replacing a horizontal subterranean gas, water or sewer conduit 40 which communicates with a manhole 39 (FIG. 1) or a narrow excavation (not illustrated) made for the purpose. Accordingly, an opening 41 is made in the concrete bottom of the manhole 39, typically as far away from the conduit 40 as possible, and the bottom end of the piling 2 of the vertical pull apparatus 1 is inserted through the opening 41 and into the underlying ground beneath the manhole 39 to secure the piling 2 and the power pole 5 in a generally vertical position in the manhole 39, as illustrated in FIG. 1, with the piling 2 typically extending upwardly through the manhole opening. The hydraulic lines 28, attached to an appropriate hydraulic fluid pump and supply mechanism (not illustrated), are connected to the hydraulic cylinder 24. After the cable 30 is extended through the conduit 40, around the sheave 11, through the hydraulic cylinder 24 and the piston 25, and through the lower cable-gripping element 22 and the upper cable-gripping element 20 of the vertical pull apparatus 1, a pipe bursting head 36, which may be conventional, is attached to the horizontal segment 32 of the cable 30 through an excavation (not illustrated) or a second manhole (not illustrated) at the end of the conduit 40 opposite the manhole 39. During subsequent operation of the vertical pull apparatus 1 by acutation of the hydraulic cylinder 24 as heretofore described, the horizontal cable segment 32 is incrementally pulled horizontally through the sheave 11 and the pipe bursting head 36 is shown horizontally against the conduit

40 to progressively migrate and burst the conduit 40 along its length. Simultaneously, a replacement conduit 43, attached to the pipe bursting head 36, is typically drawn into place behind the conduit 40 as the conduit 40 is burst. At the end of the pipe bursting and replacing operation, the pipe bursting head 36 is removed from the replacement pipe 43 in the manhole 39 and the vertical pull apparatus 1 is lifted from the manhole 39.

It will be appreciated by those skilled in the art that the vertical pull apparatus of this invention is suitably adapted for a variety of applications in which it is desired to transmit a vertical pulling motion into a horizontal pulling motion, particularly under circumstances in which limited space is available for accommodating the pulling equipment, such as in the bursting and replacement of sewer, water or gas lines. The vertical pull apparatus can be anchored in an open manhole, pit or excavation or on the ground for a variety of pulling applications, including but not limited to pipe-bursting and replacing, and is capable of use with any type of pipe-bursting equipment. Referring again to FIG. 1, in an alternative, dual-cylinder embodiment (not illustrated) of the vertical pull apparatus 1, the upper cable-gripping element 20, rather than being stationarily mounted on a cable gripping element bracket 19 as heretofore described, can be fitted on a piston 25 (FIG. 4) extendible from a hydraulic cylinder 24 in the same manner as heretofore described with respect to the lower cable-gripping element 22, for alternately engaging and pulling the vertical cable segment 31 of the cable 30 in conjunction with the piston-mounted lower cable-gripping element 22. In this dual-cylinder embodiment, the vertical pull apparatus has continuous pull capacity for loads limited only by the size and strength of the cable 30. The construction and operation of the upper cable-gripping element 20 and the lower cable-gripping element 22 is described in U.S. Pat. No. 6,129,486, and each can be constructed in various sizes according to the diameter of the cable 30.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A vertical pull apparatus for transmitting a generally vertical pulling motion into a generally horizontal pulling motion, said apparatus comprising:

a support for positioning in a generally vertical position;

a cable-engaging mechanism provided on said support;

a cable engaging said cable-engaging mechanism, said cable-engaging mechanism defining a generally vertical cable segment and a generally horizontal cable segment in said cable;

a first cable-gripping element and a second cable-gripping element provided on said support for alternately engaging said vertical cable segment of said cable; and wherein at least one of said first cable-gripping element and said second cable-gripping element is adapted for selective bidirectional movement between a first position and a second position on said support and substantially engaging said generally vertical cable segment upon movement from said first position to said second position and releasing said generally vertical cable segment of said cable upon movement from said second position to said first position.

2. The vertical pull apparatus of claim 1 wherein said support comprises a piling and a power pole adjustably mounted on said piling, and said first cable-gripping element and said second cable-gripping element are provided on said power pole.

3. The vertical pull apparatus of claim 1 wherein said cable-engaging mechanism comprises a sheave.

4. The vertical pull apparatus of claim 3 wherein said support comprises a piling and a power pole adjustably mounted on said piling, and said first cable-gripping element and said second cable-gripping element are provided on said power pole.

5. The vertical pull apparatus of claim 1 comprising a hydraulic cylinder provided on said support and operably engaging said first cable-gripping element for moving said first cable-gripping element between said first position and said second position.

6. The vertical pull apparatus of claim 5 wherein said support comprises a piling and a power pole adjustably mounted on said piling, and said first cable-gripping element and said second cable-gripping element are provided on said power pole.

7. The vertical pull apparatus of claim 5 wherein said cable-engaging mechanism comprises a sheave.

8. The vertical pull apparatus of claim 7 wherein said support comprises a piling and a power pole adjustably mounted on said piling, and said first cable-gripping element and said second cable-gripping element are provided on said power pole.

9. A vertical pull apparatus for transmitting a generally vertical pulling motion into a generally horizontal pulling motion, said apparatus comprising:

a support for positioning in a generally vertical position;

a cable-engaging mechanism provided on said support;

a cable engaging said cable-engaging mechanism, said cable-engaging mechanism defining a generally vertical cable segment and a generally horizontal cable segment in said cable;

a hydraulic cylinder provided on said support and a piston extendible from said hydraulic cylinder;

a first cable-gripping element provided on said piston for selective bidirectional movement between a first position and a second position on said support responsive to operation of said hydraulic cylinder, said first cable-gripping element adapted for removably engaging said generally vertical cable segment of said cable upon movement from said first position to said second position and releasing said generally vertical cable segment upon movement from said second position to said first position; and a second cable-gripping element provided on said support for gripping said vertical cable segment upon movement of said first cable-gripping element from said second position to said first position and releasing said vertical cable segment upon movement of said first cable-gripping element from said first position to said second position.

10. The vertical pull apparatus of claim 9 wherein said support comprises a piling and a power pole adjustably mounted on said piling, and said hydraulic cylinder, said first cable-gripping element and said second cable-gripping element are provided on said power pole.

11. The vertical pull apparatus of claim 9 wherein said cable-engaging mechanism comprises a sheave.

12. The vertical pull apparatus of claim 11 wherein said support comprises a piling and a power pole adjustably mounted on said piling, and said hydraulic cylinder, said first cable-gripping element and said second cable-gripping element are provided on said power pole.

13. A vertical pull apparatus for transmitting a generally vertical pulling motion into a generally horizontal pulling motion and bursting a subterranean horizontal pipe, said apparatus comprising:

a support for positioning in a generally vertical position;

a cable-engaging mechanism provided on said support;

a cable engaging said cable-engaging mechanism, said cable-engaging mechanism defining a generally vertical cable segment and a generally horizontal cable segment in said cable;

a first cable-gripping element and a second cable-gripping element provided on said support for alternately engaging said vertical cable segment of said cable;

wherein at least one of said first cable-gripping element and said second cable-gripping element is adapted for selective bidirectional movement between a first position and a second position on said support and substantially engaging said generally vertical cable segment of said cable upon movement from said first position to said second position and releasing said generally vertical cable segment of said cable upon movement from said second position to said first position; and a pipe-bursting head provided on said generally horizontal cable segment of said cable for engaging the pipe, whereby said cable pulls said pipe-bursting head against the pipe and said pipe-bursting head migrates along the pipe and bursts the pipe responsive to operation of said first cable-gripping element and said second cable-gripping element.

14. The vertical pull apparatus of claim 13 wherein said support comprises a piling and a power pole adjustably mounted on said piling, and said first cable-gripping element and said second cable-gripping element are provided on said power pole.

15. The vertical pull apparatus of claim 13 wherein said cable-engaging mechanism comprises a sheave.

16. The vertical pull apparatus of claim 15 wherein said support comprises a piling and a power pole adjustably mounted on said piling, and said first cable-gripping element and said second cable-gripping element are provided on said power pole.

17. The vertical pull apparatus of claim 13 comprising a hydraulic cylinder provided on said support and operably connected to said first cable-engaging element for moving said first cable-engaging element between said first position and said second position.

18. The vertical pull apparatus of claim 17 wherein said support comprises a piling and a power pole adjustably mounted on said piling, and said hydraulic cylinder, said first cable-gripping element and said second cable-gripping element are provided on said power pole.

19. The vertical pull apparatus of claim 17 wherein said cable-engaging mechanism comprises a sheave.

20. The vertical pull apparatus of claim 19 wherein said support comprises a piling and a power pole adjustably mounted on said piling, and said hydraulic cylinder, said first cable-gripping element and said second cable-gripping element are provided on said power pole.

* * * * *